UNITED STATES PATENT OFFICE.

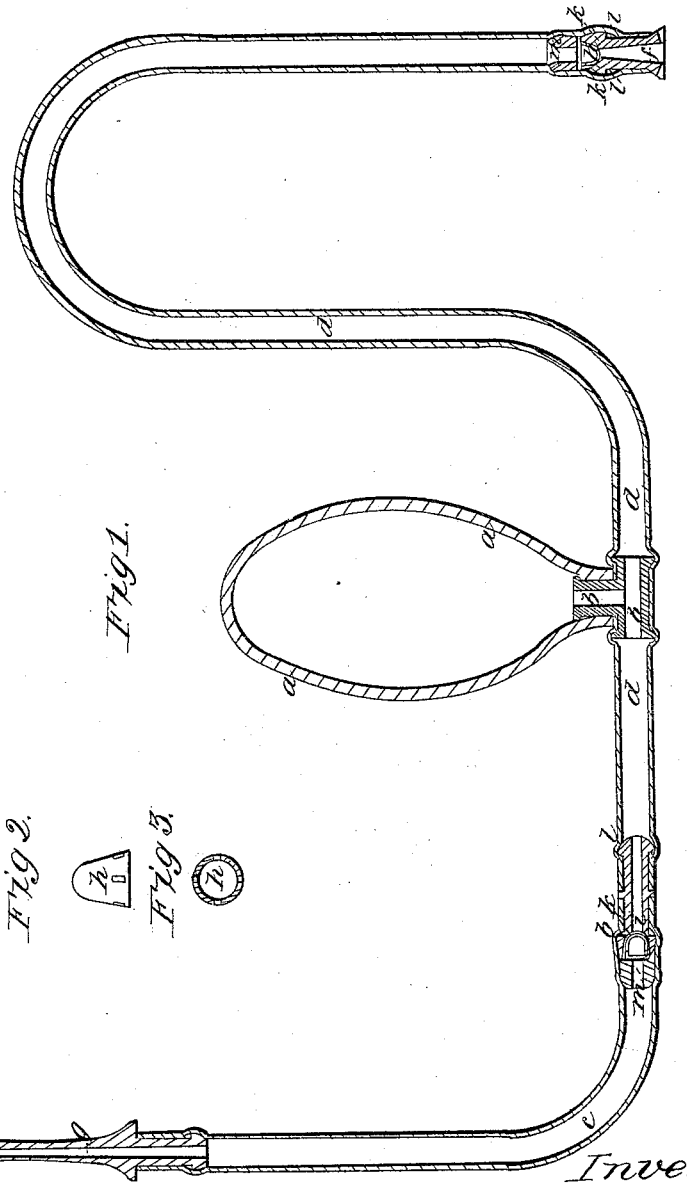

DANIEL MINTHORN, OF BEVERLY, MASSACHUSETTS, ASSIGNOR TO JOHN A. GREENE, OF BEVERLY, MASSACHUSETTS.

ENEMA-SYRINGE.

Specification of Letters Patent No. 27,596, dated March 20, 1860.

*To all whom it may concern:*

Be it known that I, DANIEL MINTHORN, of Beverly, in the county of Essex and State of Massachusetts, have invented certain new and useful Improvements in Valves for Enema-Syringes and Breast-Pumps, &c., and that the following description, taken in connection with the accompanying drawings hereinafter referred to, forms a full and exact specification of the same, wherein I have set forth the nature and principles of my said improvement by which my invention may be distinguished from all others of a similar class, together with such parts as I claim and desire to have secured to me by Letters Patent.

The accompanying drawing of which Figure 1 is a central longitudinal section of an enema syringe representing my improvements. Figs. 2 and 3 are views of the valves.

In enema syringes, breast-pumps, &c., the valves heretofore used have necessarily been so large in order to allow a sufficient quantity of fluid to pass them as to require comparatively large and bulky seats, collars, couplings, &c., which are objectionable both by their size and great cost. Ball valves which are those most commonly used for these purposes are heavy and being round do not operate quickly as they have to roll over before finding their seats. The objects of my invention are to construct a valve which shall be light, cheap, accurate and quick in its movements and so small as to be susceptible of being inclosed with its seat, &c., in the ordinary flexible tubes commonly used or in a very small metallic tube, so as to do away with the expensive and clumsy couplings, &c., heretofore employed and yet allow of the passage of as much fluid as a valve of ordinary dimensions.

My new valve consists of a thin hollow piece of metal formed by punching, bending or otherwise, with its smaller end of hemispherical shape and its sides or remaining portion extended therefrom in such a manner as to form a comparatively large open mouth, the said sides or larger portion of the valve, having one or more apertures, whereby when the valve moves from its seat the fluid will pass through the said apertures and when closing by the pressure upon the inside of the hollow valve, the valve will be carried quickly and accurately to its seat.

$a\ a$ in the drawings represents the elastic bulb or exhausting chamber of a syringe to which is attached by a three-way elbow $b\ b$, two flexible and elastic tubes $c\ c$—$d\ d$, $f$ being the receiving orifice and $g$ the injecting pipe.

$h$ is the induction valve and $i$ the eduction valve. Each valve has its seat in a tubular piece of metal $k\ k$ having shoulders $l\ l$ to prevent its slipping when inclosed in the rubber tube as shown in Fig. 1.

$m$ is a collar to keep the valve in its place also inclosed in the rubber tubing, the elasticity of which keeps the tube $k$, the collar $m$ and the valve in their proper respective positions, thereby dispensing with the screws, couplings, &c., that have been used.

The valves $h$, $i$, Figs. 2 and 3, are of semicircular shape at their small ends, as shown, while their remaining portions or sides are somewhat in the shape of a parabola and have apertures or slits formed in them as shown, so that when the valves move from their seats the fluid passes through the said apertures or slits, and when closing—the valves being hollow—the fluid will press them readily and accurately to their seats.

Thus it will be seen that a valve so constructed can be made to move in a much smaller space than other valves discharging the same amount of fluid.

In lieu of the collar $m$ a perforated strap may be fastened over the end of the tubular piece of metal $k$ to keep the valve in its place.

Having thus described my improvements, I shall state my claims as follows:

What I claim as my invention and desire to have secured to me by Letters Patent, as an improvement in syringes and pumps, is—

The hollow valve constructed with a hemispherical end and having apertures or throats formed in its sides for the fluid to pass through, substantially as set forth.

DANIEL MINTHORN.

Witnesses:
JOSEPH GAVETT,
A. W. BROWN.